United States Patent [19]
Tarnopolsky

[11] Patent Number: 5,921,133
[45] Date of Patent: Jul. 13, 1999

[54] SYSTEM AND METHOD OF CONVERSION OF GRAVITATION INTO MECHANICAL ENERGY BY MEANS OF A SEQUENCE OF IMPULSES OF FORCE

[76] Inventor: Mikhail Tarnopolsky, 7110 Ridge Ct., Brooklyn, N.Y. 11209

[21] Appl. No.: 08/910,599

[22] Filed: Jul. 31, 1997

[51] Int. Cl.[6] .................................................. F03G 3/00
[52] U.S. Cl. .................................. 74/64; 185/27; 74/63; 74/DIG. 9
[58] Field of Search .................................. 185/27; 74/63, 74/64, DIG. 9

[56] References Cited

U.S. PATENT DOCUMENTS

| | | | |
|---|---|---|---|
| 1,767,311 | 6/1930 | Rohrbacher | 185/27 |
| 1,791,386 | 2/1931 | Sprigg et al. | 74/64 |
| 5,024,637 | 6/1991 | Guichard | 475/166 |
| 5,667,038 | 9/1997 | Tarnopolsky | 185/27 |

*Primary Examiner*—Nestor Ramirez
*Assistant Examiner*—B. Mullins
*Attorney, Agent, or Firm*—Steven Horowitz

[57] ABSTRACT

Two unbalanced connectable systems are moving over the above two portions of their movement with different speed during the separation from one another.

4 Claims, 2 Drawing Sheets

SYSTEM AND METHOD OF CONVERSION OF GRAVITATION INTO MECHANICAL ENERGY BY MEANS OF A SEQUENCE OF IMPULSES OF FORCE

BACKGROUND OF THE INVENTION

The present invention relates to a new way of getting a new form of energy, using a mechanical System and Gravitation.

This invention is a logical completion of a prior invention "System and Method of conversion of Gravitation in the impulse of force" as in U.S. Pat. No. 5,667,038.

An ingeniously simple technical solution makes it easy to build and use for many applications, from toys to drop-power stations. And what is very important is that the energy source is absolutely clear.

SUMMARY OF THE INVENTION

Accordingly, it is an object of the present invention to provide a new System and method of conversion of Gravitation in the sequence of impulses of force.

In keeping with these objectives and with other, which will become apparent hereinafter, one feature of the present invention resides, briefly stated, in a system and method of conversion of Gravitation in the sequence of impulses of force, which have two rotatable unbalanced elements, and which are connected to one another by means of third elements, which are placed on the periphery of a second element and have local unbalanced masses and a certain kinematic relation to the first element, so that during a free rotation from the initial position, the first rotating element is powered by its own gravity mass, by the gravity mass of a second element and also by sequential impulses of force as a result of a rotation of local unbalanced masses and the constant separation of the gravity mass of a second element from the gravity mass of a first element which rotates with increasing speed due to that, during about two thirds of a cycle of rotation and with decreasing speed during about one third of a cycle of rotation when the unbalanced mass of a second approaches the unbalanced mass of the first element, while the second element is powered by the same source of power, by means of a third element, but rotates slower than the first element due to the reacting force.

The method of the invention includes the steps of moving two such unbalanced connectable elements over the above two portions of their movement due to the constant change of relationship between them during the separation from one another.

The invention itself, however, both as to its construction and as to its manner of operation, will be best understood from the following description of a preferred embodiment, which is accompanied by the following drawings.

DESCRIPTION OF A PREFERRED EMBODIMENT

Figure 1:
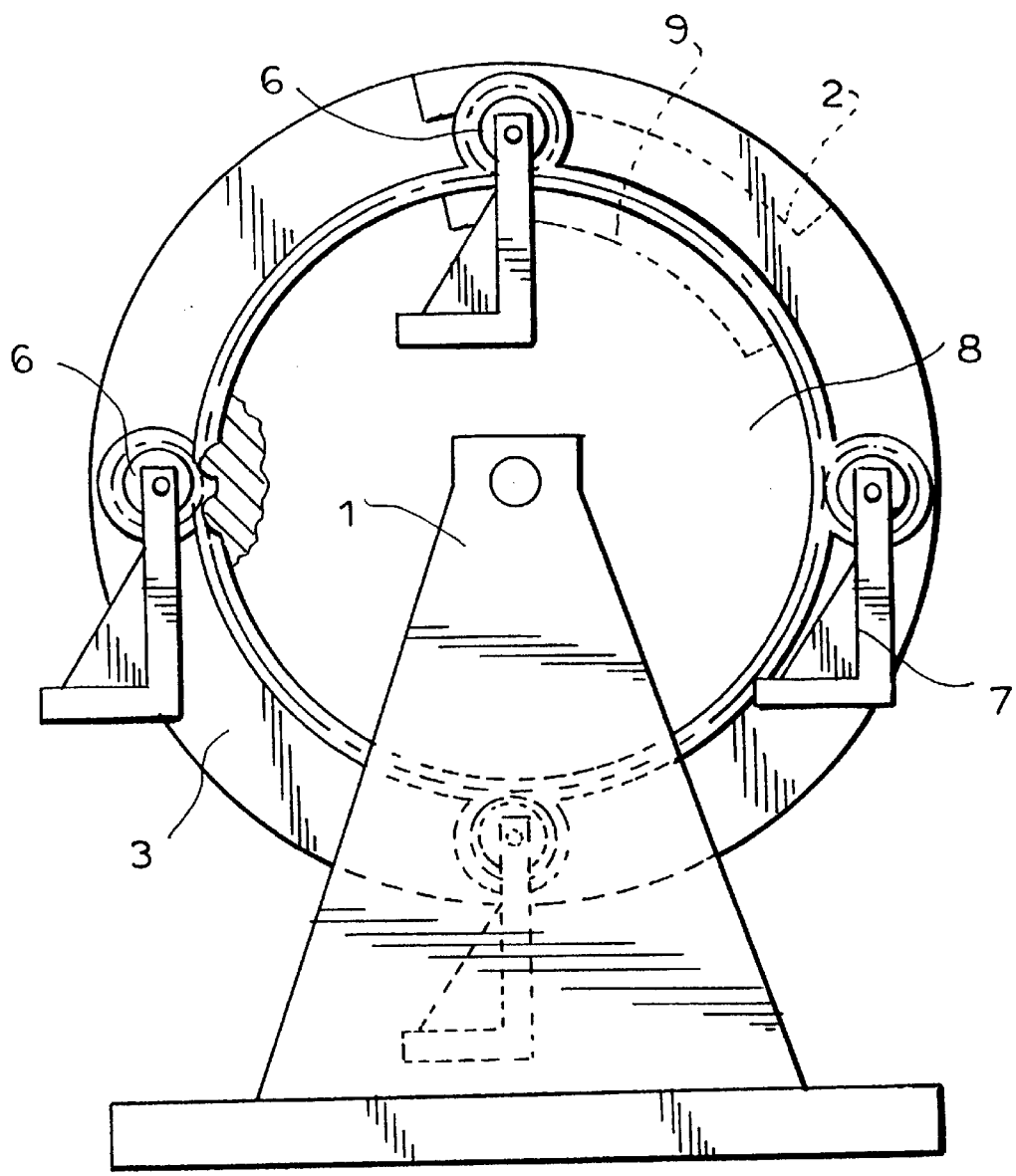
FIG. 1 is a front view of a schematic representation of a System and method of conversion of gravitation in the Sequence impulses of force.
Figure 2:
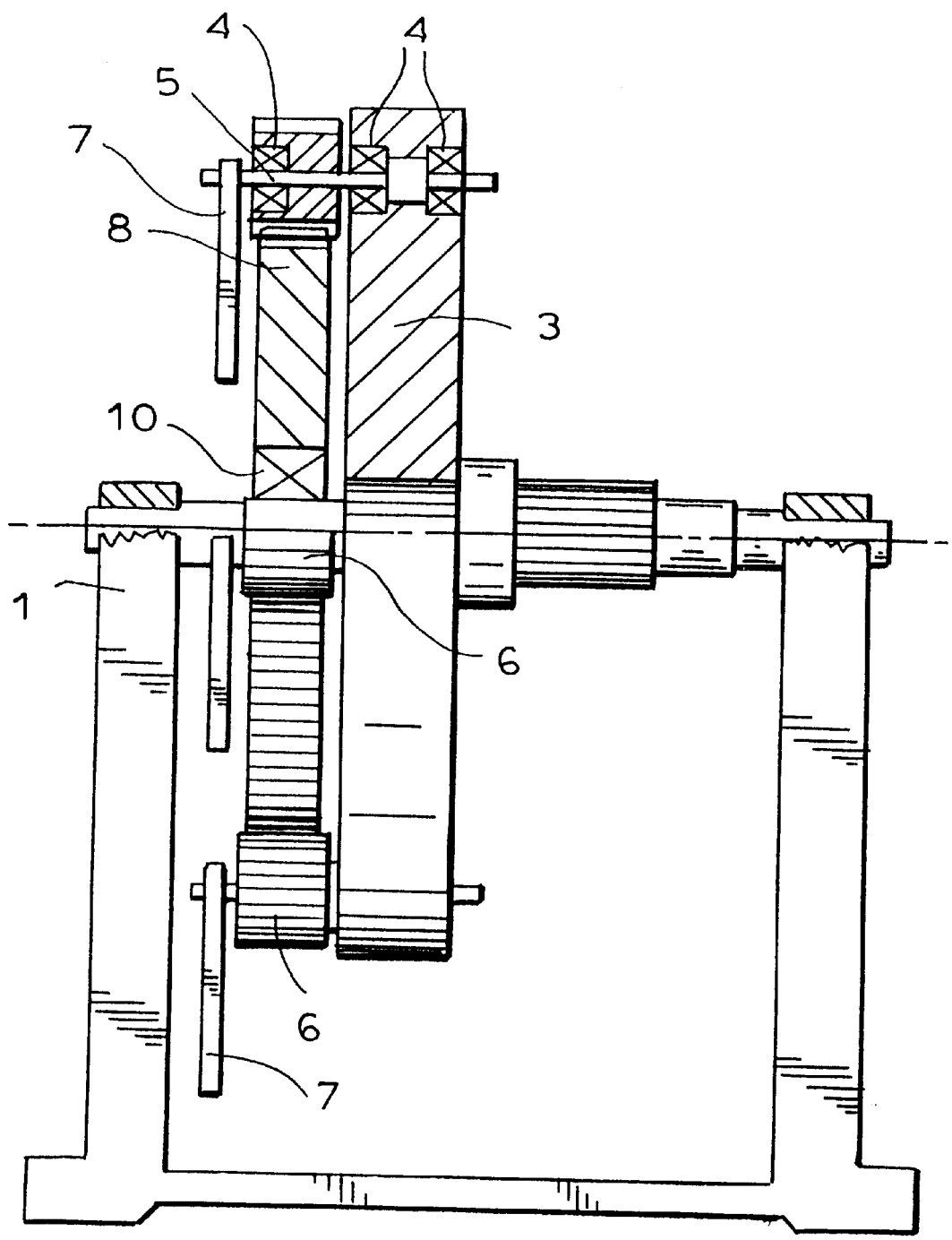
FIG. 2 is a side view of the System shown in FIG. 1

A System for conversion of gravitation in the sequence of impulses of force includes two unbalanced wheels 3 and 8 on a support 1. The wheel 3 has unbalanced mass 2 which has been calculated, as explained below, as to its proper place and magnitude and equidistantly spaced bearings combined with one-way directional overrunning clutches 4 for the axle 5. The wheel 8 has unbalanced mass 9 which has been calculated, as explained below, as to its proper place and magnitude and bearings combined with one-way directional overrunning clutch 10. Overrunning clutch 10 is called first overrunning clutch 10 and each overrunning clutch 4 is called second overrunning clutch 4. The process of obtaining a certain special unbalance includes certain steps to find the proper places and the correct masses for them to make the free-falling rotation more powerful since changing the relationship between the magnitude of the respective gravity masses acting on the wheels makes the system that the wheels are in more or less powerful. Unbalanced masses 2, 9 can represent many different unbalanced masses.

The wheels 3 and 8 have contacts spaced equidistantly and are connected to one another by means of gears 6, which are placed equidistantly on the periphery of the wheel 3 and have a certain kinematic relation to the wheel 8, having gear periphery and by means of overrunning clutch 10. Gear 6 has local unbalanced masses 7. The gears 6 and the angled levers 7 (as a local unbalanced mass of gears) attach to the axle's 5 edge. Overrunning clutches 4 connect each lever 7 to each gear 6.

The gears 6 are powered by gravity weights of angled levers 7 when whole system of the wheels 3–8 starts to move from the initial position powered by gravity of unbalanced masses 2 and 9. The local unbalanced levers 7, which make wheel 8 turn faster and hence more frequently than wheel 3 are balanced as "system of levers". The number of levers 7 would preferably be an even number. Additional power for wheel 8 goes from levers 7 to gears 6 to gear periphery to wheel 8. Power for wheel 3 goes from wheel 8 to gear periphery to the teeth of the gears 6 to axle 5 to wheel 3.

The kinematic relations between the wheels 3 and 8 is as follows: During one revolution the wheel 8 outstrips the wheel 3 for one radius of the wheel 8 because the length of a circle of the gears 6 is equal to the radius of wheel 8 (according to a working model).

Here is an explanation of how the system converts the gravitation in the sequence of impulses of force.

First of all, initial position from which the system starts to move [FIG. 1] comes as a result of the initial position of unbalanced mass 2 (as a result of a special unbalance) and of the initial position of unbalanced mass 9 (as a result of a special unbalance).

When the whole system starts to move, powered by gravity masses 2 and 9, angled levers 7 start and makes an additional turn of the double-wheel 8 (as one) by means of the gear 6. Wheel 8 starts to rotate faster than wheel 3, because wheel 3 in this case is being pushed counter clockwise by the gears. As a result of a different speed of movement, gravity mass 2 of wheel 3 starts to constantly separate from gravity mass 9 of wheel 8 which rotates with increasing speed due to that, during about two-thirds of a cycle of rotation and with decreasing speed during about one-third of a cycle of rotation, when the unbalanced mass 2 of wheel 3 approaches the unbalanced mass 9 of wheel 8.

At the moment of separation of one unbalanced mass 2, 9 from the other, the influence of gravity on the left side of the wheel 8 (the dead-zone of rotation) decreases and the influence of gravity on the right side of the wheel (the zone of active rotation) simultaneously increases.

The number of revolutions of a cycle depends on a kinematic relationship between the wheels. In our case this is 6, because the number of the teeth of the gear periphery is 168 (according to the working model) and the number of the teeth of the gear is 28 (according to the working model). 168 divided by 28 equals 6.

However, it might be another number. Levers 7 have to have the same weight and its angled parts should be heavy enough to protect the levers from the influence of the centrifugal force (as in the case of high speed of wheel 8).

The application is not limited to the details shown, since various modifications and changes are possible, without changing the patent in any way from the spirit of the invention.

What is desired to be protected by patent Letter is set forth in the appended claims.

I claim:

1. A system for conversion of gravitation into mechanical energy by means of a sequence of impulses of force, comprising:

a first rotatable element having thereon a first unbalanced mass and a second rotatable element having thereon a second unbalanced mass, the first element and the second element being connected to one another by means of gears and a first overrunning clutch, spaced equidistantly on a periphery of the second element, having a local unbalanced mass on each gear, said local unbalanced mass having an axle attached therethrough and connected to each gear by means of a second overrunning clutch, the first element having a certain kinematic relation to the second element such that during a free rotation of the first and second elements from an initial position, the first element is powered by the first unbalanced mass, by the second unbalanced mass, and by sequential impulses of force that are generated as a result of a rotation of the local unbalanced masses around their respective axles and as a result of the constant rotational separation of the second unbalanced mass from the first unbalanced mass, said sequential impulses of force causing said first rotatable element to rotate with increasing speed during approximately two-thirds of a rotational cycle of said first rotatable element and with decreasing speed during approximately one third of the rotational cycle of said first rotatable element, and the second element being powered by the second unbalanced mass, by the first unbalanced mass, by sequential impulses of force that are generated as a result of a rotation of the local unbalanced masses around their respective axles and as a result of the constant rotational separation of the second unbalanced mass from the first unbalanced mass, and by means of the gears, said second rotatable element rotating slower than the first rotatable element due to the reacting force of the increased speed of the first rotatable element.

2. The system of claim 1, wherein the first rotatable element is a wheel having thereon gear periphery, wherein the second rotatable element is a wheel, wherein the first and second unbalanced masses are stationary and wherein the local unbalanced masses are angled levers.

3. The system of claim 1, wherein the gears are connected to a gear periphery on the first rotatable element.

4. A method of converting gravitation into mechanical energy by means of a sequence of impulses of force, comprising the steps of:

placing a first unbalanced mass on a first rotatable element, placing a second unbalanced mass on a second rotatable element, connecting the first element and the second element to one another by means of gears spaced equidistantly on a periphery of the second element, placing a local unbalanced mass on each gear, said local unbalanced mass having an axle attached therethrough, calculating a certain kinematic relation between the first element and the second element such that during a free rotation of the first and second elements from an initial position, the first element is powered by the first unbalanced mass, by the second unbalanced mass, and by sequential impulses of force that are generated as a result of a rotation of the local unbalanced masses around their respective axles and as a result of the constant rotational separation of the second unbalanced mass from the first unbalanced mass, said sequential impulses of force causing said first rotatable element to rotate with increasing speed during approximately two-thirds of a rotational cycle of said first rotatable element and with decreasing speed during approximately one third of the rotational cycle of said first rotatable element, rotating the first and second elements so that the second element is powered by the second unbalanced mass, by the first unbalanced mass, by sequential impulses of force that are generated as a result of a rotation of the local unbalanced masses around their respective axles and as a result of the constant rotational separation of the second unbalanced mass from the first unbalanced mass, and by means of the gears, and so that the second element rotates slower than the first element due to the reacting force of the increased speed of the first element.

* * * * *